(12) United States Patent
Park

(10) Patent No.: US 7,203,483 B2
(45) Date of Patent: Apr. 10, 2007

(54) WIRELESS COMMUNICATION APPARATUS, METHOD THEREOF AND WIRELESS COMMUNICATION SYSTEM EMPLOYING THE SAME

(75) Inventor: Jae-han Park, Yongin (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 462 days.

(21) Appl. No.: 10/066,681

(22) Filed: Feb. 6, 2002

(65) Prior Publication Data

US 2002/0111178 A1 Aug. 15, 2002

(30) Foreign Application Priority Data

Feb. 9, 2001 (KR) ................................. 2001-6519

(51) Int. Cl.
*H04M 11/10* (2006.01)
(52) U.S. Cl. .................... 455/412.1; 455/41.2
(58) Field of Classification Search ................ 455/507, 455/418, 425, 420, 412.1, 514, 41.2, 550.1, 455/560, 561; 370/336, 496, 405, 366, 401, 370/429, 395.7, 395.71; 375/222; 710/52
See application file for complete search history.

(56) References Cited

U.S. PATENT DOCUMENTS

| 5,301,274 | A | | 4/1994 | Li |
| 6,021,124 | A | * | 2/2000 | Haartsen ..................... 370/336 |
| 6,338,105 | B1 | * | 1/2002 | Niizuma et al. .............. 710/72 |
| 6,414,969 | B1 | * | 7/2002 | Herring ..................... 370/496 |

| 2002/0082033 | A1 | * | 6/2002 | Lohtia et al. ............... 455/517 |
| 2003/0016643 | A1 | * | 1/2003 | Hamalainen et al. ........ 370/336 |

FOREIGN PATENT DOCUMENTS

| JP | 57-203135 | 12/1982 |
| JP | 60-207945 | 10/1985 |
| JP | 64-078355 | 3/1989 |
| JP | 06-132981 | 5/1994 |
| JP | 07-219874 | 8/1995 |

(Continued)

OTHER PUBLICATIONS

"Bluetooth Specification Version 1.0A Baseland Specification. 10.4 OverView of States", Bluetooth Specification Version, XX, XX, pp. 98-122 CP002227783.

(Continued)

*Primary Examiner*—Edward F. Urban
*Assistant Examiner*—Tu X. Nguyen
(74) *Attorney, Agent, or Firm*—Sughrue Mion, PLLC

(57) ABSTRACT

A wireless communication apparatus, a method thereof and a wireless communication system employing the same. The wireless communication apparatus for transceiving data wirelessly, includes a transceiving unit for transmitting and receiving data to and from an external apparatus, a buffer for temporarily storing data to be sent, the buffer having an indicator for indicating the existence of data, and a controller for checking the indicator of the buffer after the data has been sent to a destination wireless communication apparatus via the transceiving unit, and for confirming that the data is successfully sent to the destination wireless communication apparatus if there is no data in the buffer. According to the wireless communication apparatus, the method thereof and the wireless communication system applying the same, the successful transmission of the data would be easily checked.

7 Claims, 4 Drawing Sheets

FOREIGN PATENT DOCUMENTS

| | | |
|---|---|---|
| JP | 08-103555 | 4/1996 |
| JP | 10-56468 | 2/1998 |
| WO | WO 99/09698 | 2/1999 |
| WO | WO 99/09698 A1 | 2/1999 |

OTHER PUBLICATIONS

Patterson, David and Hennessy, John: "Computer Organization and Design-The Hardware Software Interface".1998, Morgan Kaufmann Publishers, Inc. San Francisco, CA, USA XP002236603 ISBN: 1-55860-428-6.

"Scatternet Structure and Inter-Piconet Communication in the Bluetooth System", IBM India Research Lab, Block 1, Indian Institute of Technology, pp. 1-4 XP000863816.

Communication dated Feb. 2, 2006.

Eynde F O et al., "A fully-integrated single-chip SOC for Bluetooth" Feb. 5, 2001, pp. 196-197, XP010536234.

T. Flik, H. Liebig; "Mikroprozessortechnik"; 1994; XP002365880.

Shu Lin et al. "Automatic-Repeat-Request Error-Control Schemes" IEEE Communication Magazine, NY NY; vol. 22, No. 12 Dec. 1, 1984; pp. 5-17 XP000674086.

\* cited by examiner

WIRELESS COMMUNICATION APPARATUS, METHOD THEREOF AND WIRELESS COMMUNICATION SYSTEM EMPLOYING THE SAME

BACKGROUND OF THE INVENTION

1. Field of the Invention

The present invention relates to a wireless communication apparatus and a method thereof, and, more particularly, to a wireless communication apparatus, a method thereof and a wireless communication system employing the same wherein a data processing unit can judge correctly whether data has been sent in a Bluetooth system. The present application is based on Korean Patent Application No. 2001-6519 filed Feb. 9, 2001, which is incorporated herein by reference.

2. Description of the Related Art

Bluetooth communication has recently been popular as a local wireless communication, and can wirelessly transmit information such as audio data and video data within the range of 10 m to 100 m with the speed of up to 1 Mbps.

The existing Bluetooth system uses ISM (Industrial Scientific Medical) band of 2.4 GHz.

FIG. 1 is a view showing the structure of a Piconet of a Bluetooth communication system.

Referring to FIG. 1, in a Bluetooth communication system, a Piconet is formed such that a multiple of slave devices ($S_1$–$S_7$) are connected to a master device (M). At most, seven slave devices ($S_1$–$S_7$) can be connected to the master device (M) in an active mode in one piconet.

In the Piconet, the master device (M) and the slave devices ($S_1$–$S_7$) communicate through a packet.

FIG. 2A is a view showing the structure of a conventional packet transmitted in the Piconet of FIG. 1.

FIG. 2B is a view showing a header part of the packet in detail.

Referring to FIG. 2B, a packet header has a total of 18 bits of AM_ADDR, TYPE, FLOW, ARQN, SEQN, and HEC.

ARQN having a payload is an acknowledge indicator of 1 bit, and is used for notifying a source of a successful transmission without CRC (Cyclic Redundancy Check) error.

A response message having acknowledge information takes two forms of acknowledgement: positive acknowledgement (ACK) and negative acknowledgement (NAK). The ACK is set as ARQN=1, and the NAK is set as ARQN=0.

Moreover, in a current Bluetooth communication, the master device and the slave devices perform bi-directional communication by a TDD (Time Division Duplex) method as shown in FIG. 3.

The master device designates and transmits data to a target slave device in the Tx slot. In FIG. 3, 1 and 2 in the target Tx slots of the master are designated for slave 1 and slave 2, respectively.

The slave devices designated by the master device receive the corresponding data in an Rx slot.

FIG. 4 is a view showing a protocol stack of a Bluetooth communication system.

LMP (Link Manager Protocol) establishes a link between a source wireless communication apparatus and a destination wireless communication apparatus, and manages security and control thereof.

The LMP defines a packet containing a response message to a request-to-send message.

After sending the request message, the source wireless communication apparatus receives the response message from the destination wireless communication apparatus within a predetermined time, in other words within a LMP response time. Therefore, the source wireless communication apparatus confirms the acknowledge information of the request message, or whether the request message is received by the destination wireless communication apparatus, then determines whether to re-send the request message or to perform the next operation according to the message flow.

On the other hand, in the LMP (Link Manager Protocol), when a piconet does not have a response message, the source wireless communication apparatus confirms whether the destination wireless communication apparatus received a signal, a base band (refer to FIG. 4) judges acknowledge information included in the header of a Null packet, or an ARQN value included in the header is judged and acknowledge information is offered to the LMP (Link Manager Protocol).

In addition, when sending request information, that is, when sending more than two different data messages consecutively, after receiving request message data from another wireless communication apparatus, a wireless communication apparatus having a Bluetooth module processes the received null packet in the base band after sending the first message and offers acknowledge information to the LMP (Link Message Protocol).

Then, the LMP (Link Message Protocol) determines whether to send a second message using acknowledge information received from the base band or to send the first message again.

As described above, if a request message not having a response message is sent in a conventional Bluetooth communication mode, it can be checked whether the request message has been sent successfully by the transmission of the acknowledge information from the base band to the LMP (Link Message Protocol).

Therefore, it causes overload in the base band, and there is increased signaling interface between the base band and the LMP (Link Message Protocol).

SUMMARY OF THE INVENTION

The present invention has been made to overcome the above-mentioned problems of the related art. Accordingly, it is an object of the present invention to provide a wireless communication apparatus, the method thereof and a wireless communication system employing the same, capable of checking whether the data has been sent successfully.

The above object is accomplished by a wireless communication apparatus transceiving data without using wire, which includes a transceiving unit for transmitting and receiving data to and from an external apparatus, a buffer for temporarily storing data to be sent and the buffer has an indicator for indicating the existence of data, and a controller for checking the indicator of the buffer after the data is sent to the destination wireless communication apparatus via the transceiving unit, and for confirming that the data is sent to the destination wireless communication apparatus successfully if there is no data in the buffer.

Preferably, the wireless communication apparatus further includes a timer for setting a waiting time for checking whether the sending of the data has succeeded or failed, and the controller checks the buffer when the predetermined time of the timer is exceeded.

To accomplish another object of the present invention, it is provided that a method for wireless communication comprising the steps of (a) temporarily storing data to be sent in the buffer, and activating the indicator of the buffer if the data exists in the buffer (b) examining the buffer after sending the data to a destination wireless communication apparatus, and (c) confirming that the sent data has been sent to the destination wireless communication apparatus if the indicator indicates that there is no data in the buffer.

The method for wireless communication further includes the step of setting a waiting time for checking if the data has been sent, and after the predetermined time has passed, it is preferable that the indicator of the buffer is checked.

Moreover, to accomplish another object of the present invention, there is provided a wireless communication system, wherein a multiple of wireless communication apparatuses act as either a master device or slave devices, and when the master wireless communication apparatus sends data to the destination slave wireless communication apparatus, wherein the data to be sent is temporarily stored in the buffer, the indicator of the buffer indicates the existence of the data in the buffer, and sends the data to the destination slave device. After that, if the indicator indicates the non-existence of the data in the buffer, the sent data is confirmed to have been sent to one of the destination slave devices.

BRIEF DESCRIPTION OF THE DRAWINGS

Reference may now be made to the accompanying drawings for a better understanding of the present invention, in which.

DETAILED DESCRIPTION OF THE PREFERRED EMBODIMENT

From now on, a wireless communication apparatus, the method thereof, and a wireless communication system employing the same, according to the preferred embodiment, will be described in detail referring to the appended drawings.

Figure 5:
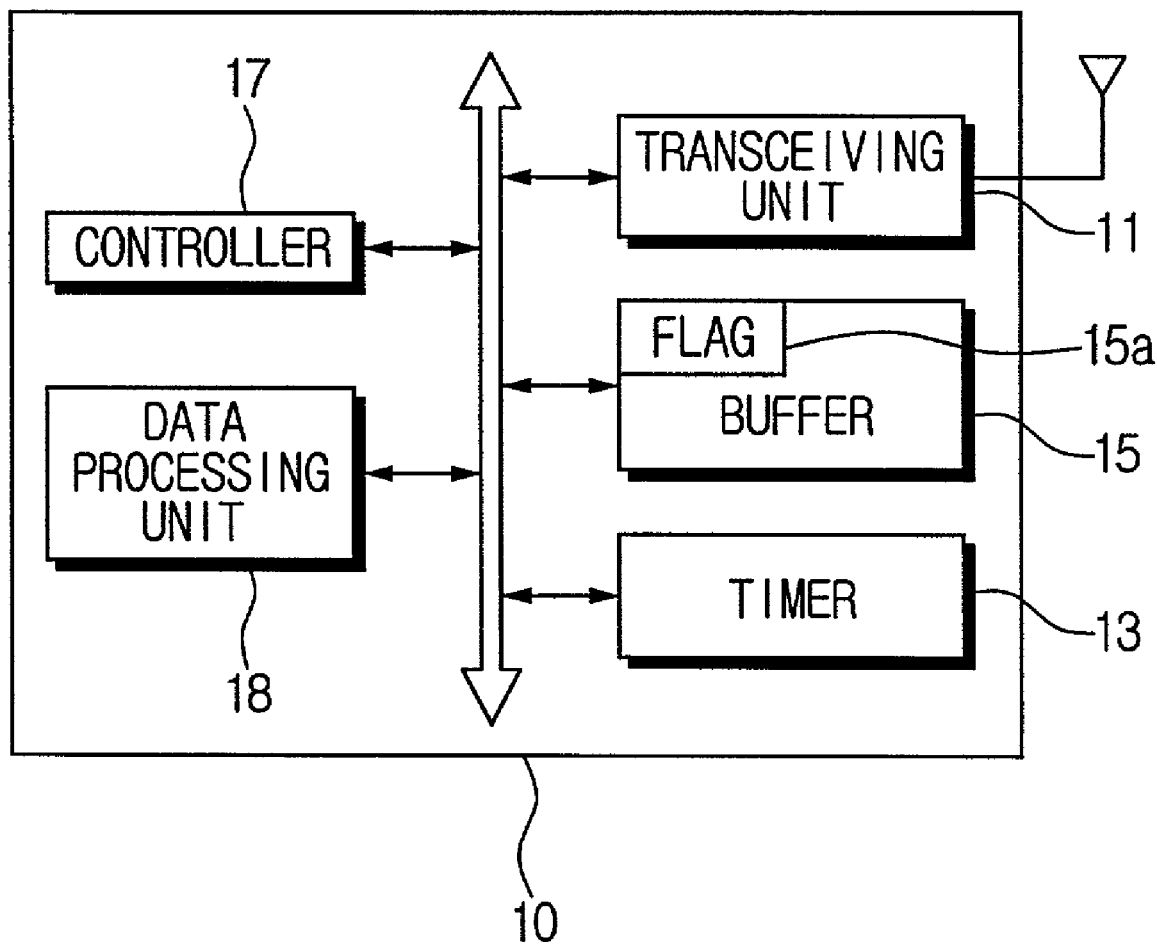
FIG. 5 is a block diagram of a wireless communication apparatus according to the present invention.

FIG. 5 is a block diagram showing a wireless communication apparatus according to the present invention.

Referring to FIG. 5, a wireless communication apparatus 10 comprises a transceiving unit 11, a timer 13, a buffer 15, a controller 17 and a data processing unit 18.

The transceiving unit 11 processes a received signal such as RF (Radio Frequency) signal of 2.4 GHz band, and sends a packet intended to be sent.

The buffer 15 has a flag 15a, and temporarily stores data intended to be sent via the transceiving unit 11.

If there is data stored in the buffer 15, the flag 15a is set to be true (flag=true), and if there is no data stored in the buffer 15, then the flag 15a is set to be false (flag=false).

The wireless communication apparatus can confirm that the data has been sent correctly by checking the flag 15a.

The timer 13 sets time for checking if the data has been sent successfully.

The time for checking whether the data has been sent successfully has to be less than LMP response timeout (30 seconds) or Supervision Timeout (default 20 seconds, maximum 40.9 seconds).

Figure 1:
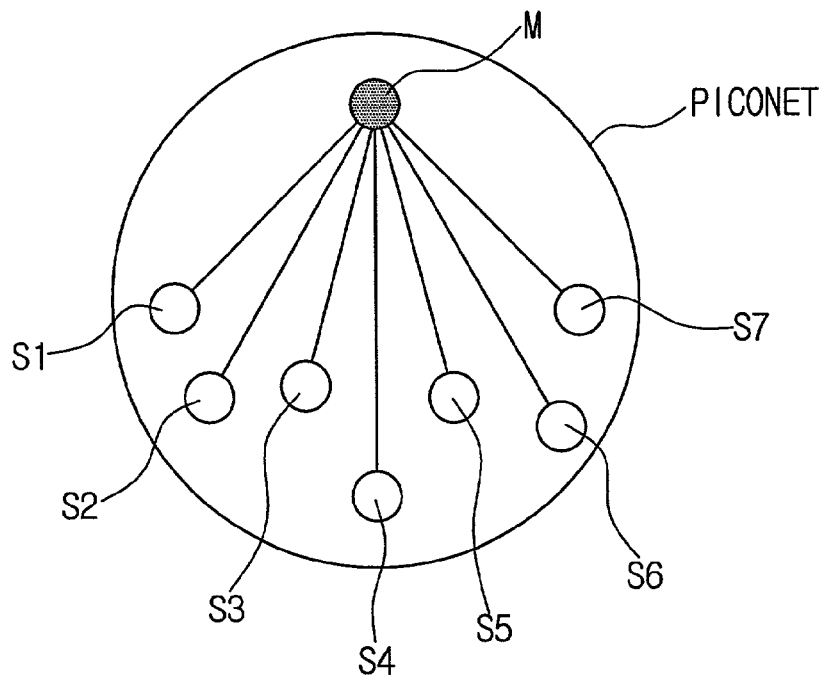
FIG. 1 is a view showing the structure of a Piconet of a conventional Bluetooth communication system.
Figure 2A:
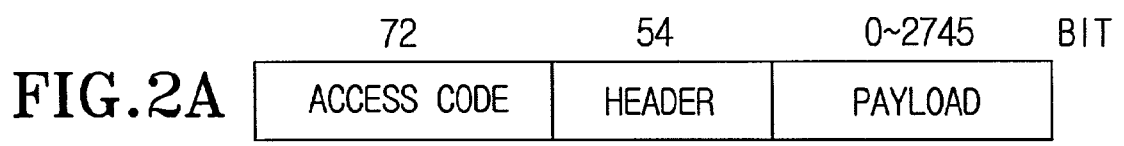
FIG. 2A is a view showing the structure of a conventional packet transmitted in the Piconet of FIG. 1.
Figure 2B:
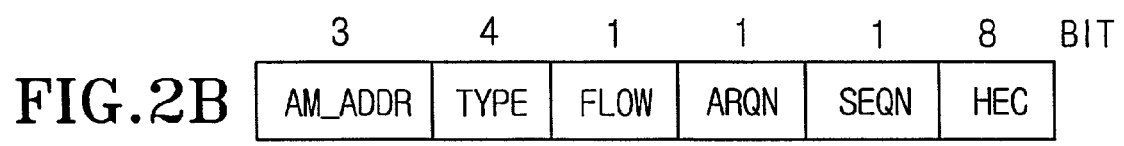
FIG. 2B is a view showing a header region of the packet in detail.
Figure 3:
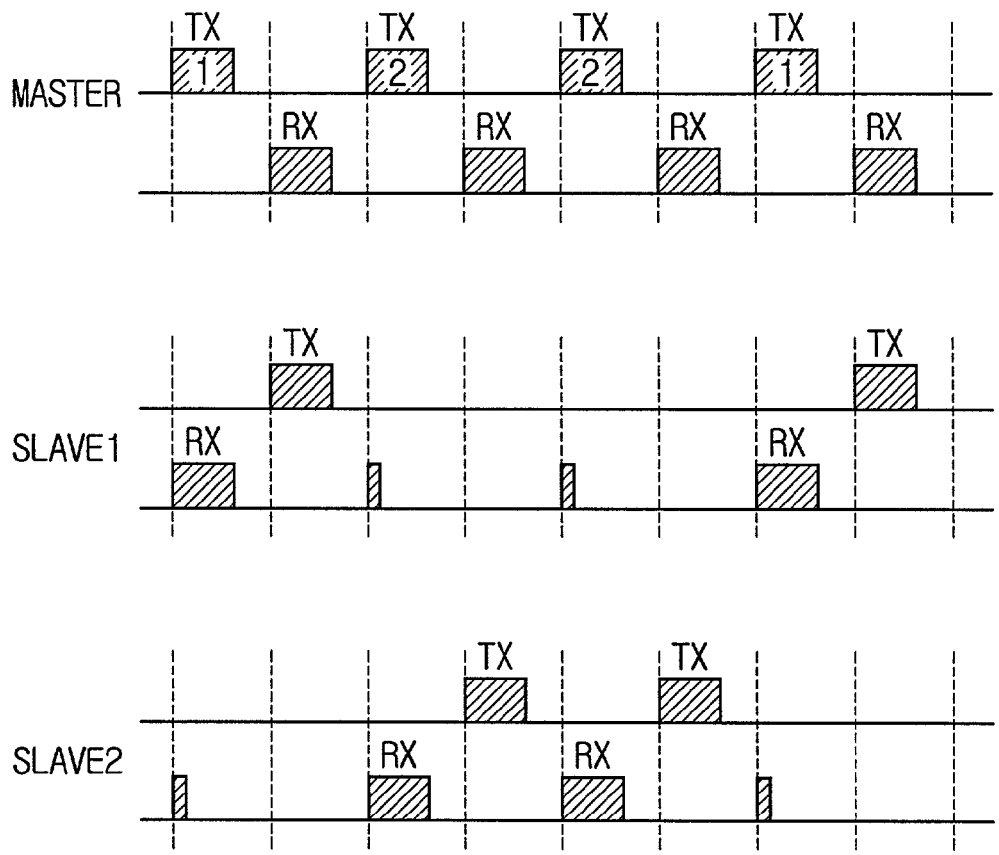
FIG. 3 is a view showing Rx/Tx timing in a Bluetooth communication system.
Figure 4:
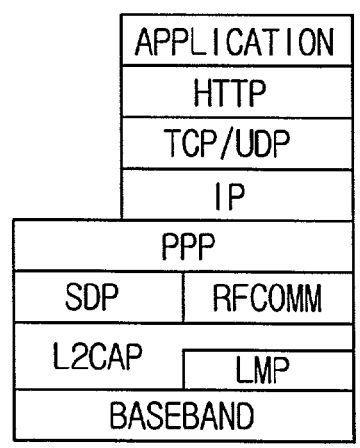
FIG. 4 is a view showing a protocol stack of a Bluetooth communication system.

The controller 17 corresponds to the baseband of a protocol stack of the Bluetooth in FIG. 4, and communicates with a host connected via a HCI (Host Controller Interface) (not shown). The host can be various communication terminals such as laptop computers, cellular phones, and printers.

The data processing unit 18 corresponds to the LMP of a protocol stack of the Bluetooth in FIG. 4, and performs the functions such as controlling of the transceiving unit 11, link controlling, controlling the logic channel, data whitening, address allocating, and security.

In addition, the data processing unit 18 confirms that the data has been sent successfully by checking the flag 15a of the buffer 15 when transmitting a data packet having no response message, and transmits request message data of its own after receiving request message data from another wireless communication apparatus, namely more than two different types of message data consecutively.

Here, if a checking time of transmission success is predetermined in the timer 13, the data processing unit 18 confirms the transmission of the data by checking the flag 15a of the buffer 15 when the time predetermined in the timer 15 is exceeded.

At that time, if the flag 15a indicates 'false', then it is determined that the data has been sent successfully.

Next, the operation of the wireless communication apparatus will be described referring to FIG. 6.

Figure 6:
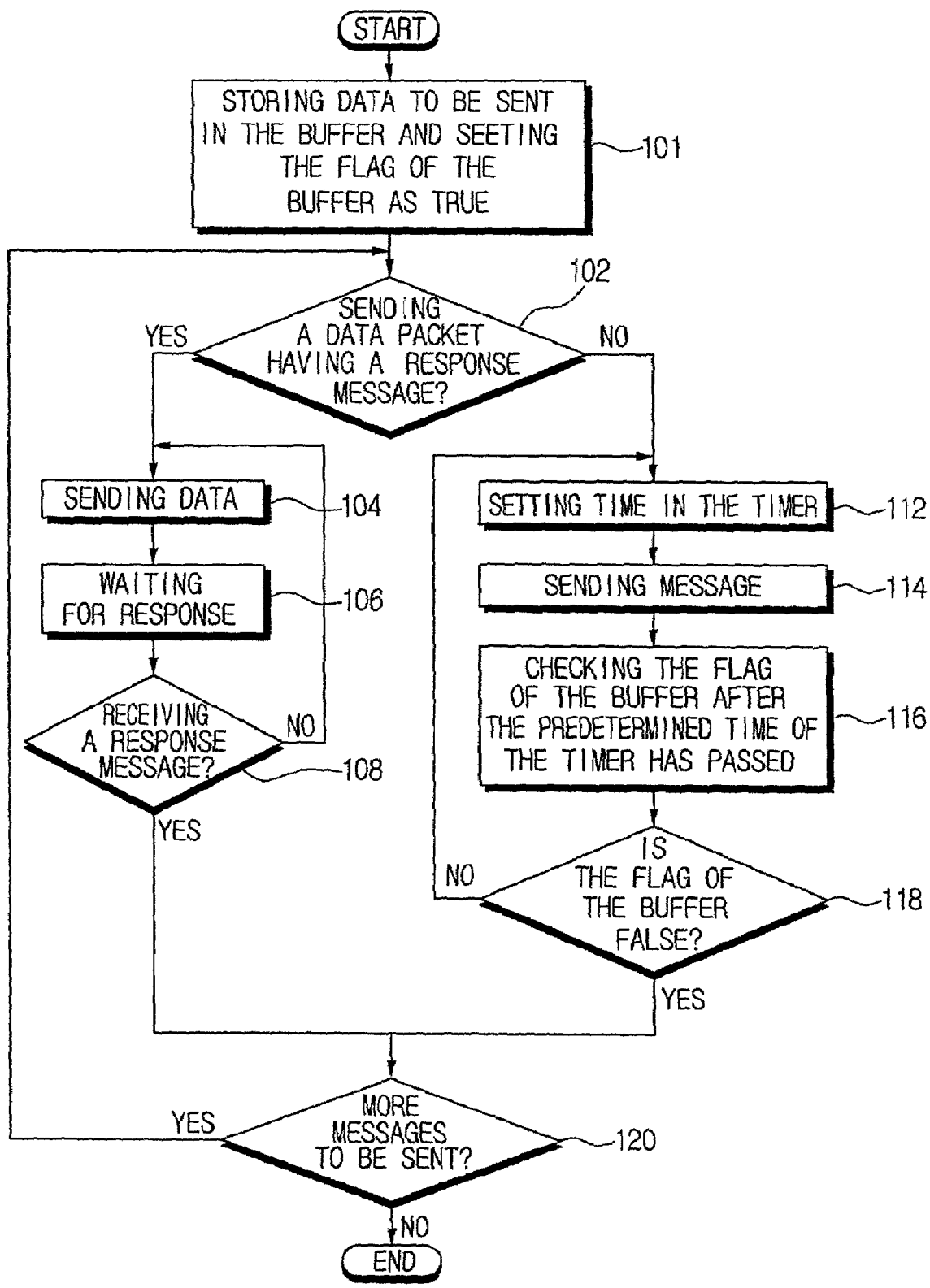
FIG. 6 is a flow chart of a communication method according to the present invention.

FIG. 6 is a flow chart of a wireless communication method according to the present invention.

First of all, when the source wireless communication apparatus intends to transmit data, the wireless communication apparatus stores the data in the buffer 15, and sets the flag 15a of the buffer 15 as 'true' (step 101).

Then, the wireless communication apparatus checks whether the data intended to be sent is a data packet having a response message (step 102).

When the data packet has a response message, the data is sent (step 104).

Then, the wireless communication apparatus waits for the reception of a response message during the LMP response time.

After that, the wireless communication apparatus checks the reception of the response message (step 108), and if the response message has not been received, the data is re-sent.

After checking that the data has been transmitted successfully, the wireless communication apparatus checks again if there is more data to be sent (step 120). If there is more data to be sent, the wireless communication apparatus returns to the step 102.

Meanwhile, when there is no response message, such as when sending data having no response message or sending more than two different types of message consecutively, the waiting time for checking whether the data has been transmitted successfully is set in the timer 13 (step 112). Then, in the Tx slot, the data is read from the buffer 15 and sent (step 114).

Next, after the time set in the timer 13 is exceeded, the wireless communication apparatus checks the flag 15a of the buffer 15 (step 116).

If the flag 15a of the buffer 15 indicates 'true,' it means that the data is stored in the buffer 15, thus it is confirmed that the data has not been sent to a destination wireless communication apparatus.

Therefore, the wireless communication apparatus returns to the step of 112, sets the time in the timer 13, then repeats from the step 114 to the step 118.

However, if the flag 15a of the buffer 15 indicates 'false,' it means that the data has been sent without being stored in the buffer 15, thus the wireless communication apparatus confirms that the data has been successfully sent to the destination wireless communication apparatus.

After confirming the successful sending of the data, the source wireless communication apparatus checks whether there is more data to be sent. If there is more data to be sent, the source wireless communication apparatus returns to step 102.

As described so far, according to the wireless communication apparatus, the method thereof, and the wireless communication system employing the same of the present invention, the successful transmission of data can be easily checked.

In addition, the amount loaded in the base band will be decreased, and the signaling interface between the base band and the LMP can be reduced.

Although the preferred embodiment of the present invention has been described, it will be understood that the present invention should not be limited to this preferred embodiment, but various changes and modifications can be made by one skilled in the art within the spirit and the scope of the present invention as hereinafter claimed.

What is claimed is:

1. A wireless communication apparatus for transceiving data wirelessly, comprising:
   a transceiving unit for transmitting and receiving data to and from an external apparatus;
   a buffer for storing data, the buffer having an indicator for indicating an existence of data; and
   a controller for checking the indicator of the buffer with regard to the data being sent to a destination wireless communication apparatus via the transceiving unit, and for confirming that the data is sent to the destination wireless communication apparatus successfully if there is no data in the buffer, wherein the controller checks a flag of the buffer and obtains acknowledgement information of the data which is sent to the destination wireless communication apparatus, only when sending data having no response message.

2. A wireless communication apparatus for transceiving data wirelessly, comprising:
   a transceiving unit for transmitting and receiving data to and from an external apparatus;
   a buffer for storing data, the buffer having an indicator for indicating an existence of data; and
   a controller for checking the indicator of the buffer with regard to the data being sent to a destination wireless communication apparatus via the transceiving unit, and for confirming that the data is sent to the destination wireless communication apparatus successfully if there is no data in the buffer, wherein the controller checks a flag of the buffer and obtains acknowledgement information of the data which is sent to the destination wireless communication apparatus, when sending more than two different types of message data, wherein respective ones of said more than two different types of message data are sent consecutively.

3. A wireless communication apparatus for transceiving data wirelessly, comprising:
   a transceiving unit for transmitting and receiving data to and from an external apparatus;
   a buffer for storing data, the buffer having an indicator for indicating an existence of data;
   a controller for checking the indicator of the buffer with regard to the data being sent to a destination wireless communication apparatus via the transceiving unit, and for confirming that the data is sent to the destination wireless communication apparatus successfully if there is no data in the buffer; and
   a timer for setting a waiting time for checking if data has been sent, and the controller checks the indicator of the buffer when a predetermined time of the timer is exceeded.

4. A wireless communication method for transceiving data wirelessly, comprising the steps of:
   a) storing data to be sent in a buffer, and activating an indicator of the buffer when the data exists in the buffer;
   b) examining the buffer after sending the data to a destination wireless communication apparatus; and
   c) confirming that the data has been sent to the destination wireless communication apparatus if the indicator indicates that there is no data in the buffer,
   wherein only when sending a data packet without a response message, the step (b) checks the flag of the buffer and obtains the acknowledge information of the data.

5. A wireless communication method for transceiving data wirelessly, comprising the steps of:
   a) storing data to be sent in a buffer, and activating an indicator of the buffer when the data exists in the buffer;
   b) examining the buffer after sending the data to a destination wireless communication apparatus; and
   c) confirming that the data has been sent to the destination wireless communication apparatus if the indicator indicates that there is no data in the buffer, wherein, when sending more than two different types of message data, the step (b) checks the flag in the buffer and obtains acknowledgement information of the data, wherein respective ones of said more than two different types of message data are sent consecutively.

6. A wireless communication method for transceiving data wirelessly, comprising:
   a) storing data to be sent in a buffer, and activating an indicator of the buffer when the data exists in the buffer;
   b) examining the buffer after sending the data to a destination wireless communication apparatus;
   c) confirming that the data has been sent to the destination wireless communication apparatus if the indicator indicates that there is no data in the buffer; and
   d) setting a waiting time for checking if the data has been sent, wherein the indicator of the buffer is checked after a predetermined time has passed.

7. A wireless communication system comprising a plurality of wireless communication apparatuses, each of which operates as a master or a slave, the master wireless communication apparatus sends data to a destination slave wireless communication apparatus, wherein the master wireless communication apparatus stores the data in a buffer, activates an indicator of the buffer with regard to an existence of the data in the buffer, sends the data to the destination slave device, checks the indicator of the buffer, and, if the indicator indicates a non-existence of the data in the buffer, the master wireless communication apparatus confirms that data has been sent to the destination slave device,
   wherein a controller checks a flag of the buffer and obtains acknowledgement information of the data which is sent to the destination slave device, only when sending data having no response message.

* * * * *